United States Patent
Jensen et al.

(10) Patent No.: US 9,283,724 B2
(45) Date of Patent: Mar. 15, 2016

(54) METHOD AND INSERT FOR MANUFACTURING A MULTI-DENSITY SHOE SOLE

(75) Inventors: Frank Jensen, Bredebro (DK); Ejnar Truelsen, Tønder (DK)

(73) Assignee: ECCO SKO A/S, Bredebro (DK)

( * ) Notice: Subject to any disclaimer, the term of this patent is extended or adjusted under 35 U.S.C. 154(b) by 742 days.

(21) Appl. No.: 13/505,799

(22) PCT Filed: Nov. 4, 2010

(86) PCT No.: PCT/EP2010/006713
§ 371 (c)(1),
(2), (4) Date: Jun. 26, 2012

(87) PCT Pub. No.: WO2011/054509
PCT Pub. Date: May 12, 2011

(65) Prior Publication Data
US 2012/0255205 A1    Oct. 11, 2012

(30) Foreign Application Priority Data
Nov. 6, 2009  (DK) ................................. 2009 01195

(51) Int. Cl.
| A43B 13/12 | (2006.01) |
| B29D 35/14 | (2010.01) |
| A43B 1/00 | (2006.01) |
| A43B 21/26 | (2006.01) |
| A43B 23/17 | (2006.01) |
| B29D 35/08 | (2010.01) |

(52) U.S. Cl.
CPC ............ *B29D 35/144* (2013.01); *A43B 1/0027* (2013.01); *A43B 21/26* (2013.01); *A43B 23/17* (2013.01); *B29D 35/081* (2013.01)

(58) Field of Classification Search
CPC ..... B29D 35/082; B29D 35/08; B29D 35/084
USPC .......................................................... 264/244
See application file for complete search history.

(56) References Cited

U.S. PATENT DOCUMENTS 3,480,979 A * 12/1969 Gammons ................... 12/142 R
3,806,974 A *  4/1974 Di Paolo ................... 12/142 RS

FOREIGN PATENT DOCUMENTS

| DE | 4129361 C2 | 7/1992 |
| DE | 4115045 A1 | 11/1992 |
| DE | 4114088 C1 | 12/1992 |
| EP | 1637051 A1 | 2/2004 |
| GB | 2255308 A * | 11/1992 |
| WO | 2007/108024 A1 | 9/2007 |

* cited by examiner

*Primary Examiner* — Galen Hauth
(74) *Attorney, Agent, or Firm* — Nath, Goldberg, & Meyer; Jerald L. Meyer (57) ABSTRACT

A method for manufacturing a multi-density shoe sole is described, the method incorporates repeated injections of sole material onto a shoe upper mounted on a last and placed in a mold. The mold has an injection chamber, moveable side frames, a vertically moveable bottom piston and a shoe sole shaping insert which is placed in the mold prior to a first injection and removed from the mold after said first injection and prior to a second injection. The entire body of the shoe sole shaping insert is placed inside the injection chamber during the first injection. The shoe sole shaping insert acts as a dummy during the first injection, and leaves after its removal a cavity which in a later injection step is filled with another sole material, either another color or another density. Also disclosed is an insert used in a mold for injection molding of shoe soles.

14 Claims, 9 Drawing Sheets

METHOD AND INSERT FOR MANUFACTURING A MULTI-DENSITY SHOE SOLE

This is a National Phase Application filed under 35 U.S.C. 371 as a national stage of PCT/EP2010/006713, filed 4 Nov. 2010, claiming the benefit from Denmark Patent Application No. PA2009 01195, filed 6 Nov. 2009, the content of which is hereby incorporated by reference in its entirety.

Shoe soles manufactured by injection moulding processes come in different densities. A one-density sole is a sole manufactured in one material only, for example one kind of polyurethane. A two-density sole can be made of two different types of polyurethane each having different characteristics as to e.g. hardness and shock absorption. Technical solutions of how to manufacture multi-density soles have been extensively described in the patent literature since manufacturing of injected soles began at the end of the 1960's. Typically the multi-density sole consists of two or three layers on top of each other and extending longitudinally from the heel to the toe end. DE4114088 C1 describes a method and apparatus for making a three-density sole. A mould includes two movable side frames, a bottom piston and a contour plate. The contour plate is a removable part of the mould, and is prior to injection of sole material placed on a vertically extending edge of the bottom piston. This edge runs along the circumference of the piston. When placing the contour plate on the edge of the piston, two injection cavities are created, one above the plate and one beneath. A first injection in the upper cavity creates a shaft sole, and a second injection in the lower cavity creates the outsole. After these injections the mould is opened, the contour plate is removed, the mould closed again and a third injection is made between the upper and lower cavity thus creating a midsole. In some design cases, however, a simple vertically layered and longitudinally stretching material diversity of the sole is not sufficient. Often the shoe designer wants a particular area of the sole to be harder than the rest of the sole, or to have another colour in a certain spot. Such localized need cannot be met with the method of DE4114088 C1. A solution to this problem is, however, addressed in DE4129361 C2 which describes the manufacture of a three-density sole by use of removable plates in the mould. The plates are part of the mould and have the same outer dimensions as the bottom piston. The plates delimit small pre-defined cavities in the mould. After first injections of sole material into the mould the small cavities are filled with soft or hard polyurethane respectively, and the mould is opened. Then a first plate is removed from the mould and the mould is closed again and ready for the next injection. The method enables the manufacture of a multi-density shoe sole where the different density areas are not only layered and vertically sandwiched across the sole but also piecewise segmented across the horizontal length of the sole, i.e. you can have one density in the heel area, a second density in the midfoot and a third density in the front end. A drawback with this solution is the extensive requirements to the machinery. An automatic mechanical arm is moving the removable plate back and forth to the mould which movement requires space in the factory. Further the mould has an increased height due to the removable plate because it is sandwiched between the bottom piston and a last with an upper.

Based on the drawbacks of the prior art there is a need for a simplified method for manufacturing a multi-density shoe sole.

Such simplified method is described in claim 1.

Instead of using a conventional removable mould plate having dimensions larger than the bottom piston and having horizontally extending edges for mechanical fixation to the bottom piston or to plate exchanger machinery, a small volume solution is achieved by placing a shoe sole shaping insert entirely inside the injection chamber. The injection chamber is defined as the open space delimited by the top of the bottom piston and the two side frames while they abut an upper. More precisely the injection chamber is the open space that is created when the bottom piston has been raised, the side frames have been closed around the bottom piston, and the lasted upper has been lowered into a position ready for injection. Inside this space, where the injection material is injected and intended to flow, the entire body of the shoe sole shaping insert is placed inside the outer perimeter of the bottom piston prior to a first injection, then removed from the chamber after said first injection, whereupon a second injection takes place. In its simplest version the shoe sole shaping insert is placed into the mould by the hand of a human operator. The insert is unbound and movable and removable from the mould. The shoe sole shaping insert is ideally shaped fully or partly as the shoe sole and therefore fits easily into the injection chamber. Shaping of the shoe sole shaping insert is made in different processes, e.g. in rapid prototyping printing processes. The shoe sole shaping insert acts as a dummy during the first injection, and leaves after its removal a cavity which is in a later injection step filled with another sole material, either another colour or another density. With the invention multi-density soles can be manufactured without the use of differently shaped bottom pistons or removable mould plates as described in the prior art. A further major advantage of the invention is that a conventional mould for a one-density sole can now very fast be changed into use for making a multi-density sole. There is no need for amending the machinery or tooling; it suffices that a shoe sole shaping insert is placed inside the injection chamber in a place where a different sole material characteristic is desired. The invention thus enables swift design changes to the material composition and visual appearance of a sole without having to mill a new aluminium mould. This saves cost and time. A design change or a design feature in the sole can advantageously be made targeted and with a high degree of precision.

In one embodiment the shoe sole shaping insert delimits a first cavity into which sole material of a given colour or density is injected through a first injection channel. After removal of the insert a second injection is made through a second injection channel into the compartment or cavity created by the removal of said insert. This embodiment creates a two-density sole.

A horizontally segmented two-density sole can also be made by letting the shoe sole shaping insert partition the injection chamber into a first and second cavity, which are spaced apart. Injection through the first injection channel with a first shoe sole material into the two cavities is then performed. The first cavity and the second cavity communicates either via a channel in the side frame of the mould or preferably through a channel in the insert. Such channel in the insert can be on the surface or inside the insert. After removal of the insert a second sole material is injected through the second injection channel into the cavity created by removal of the insert. This embodiment enables the manufacture of a horizontally segmented two-density sole, i.e. a sole having alternating first and second sole materials along the longitudinal length of the sole.

A segmented three-density sole can be made if a first density sole material is injected into the first cavity through the first injection channel and a second density sole material is injected into the second cavity through the second injection channel. The second cavity and the second injection channel communicate either via a channel in the side frame of the mould or through a channel in the insert. The insert is removed, and a third density sole material is injected through the second injection channel into the space or compartment created by the removal of the insert.

Advantageously, the shoe sole shaping insert is placed directly on the top of the bottom piston, and has a tread pattern which matingly corresponds to a tread pattern of the top of the bottom piston. In other words, the shoe sole shaping insert is nearly a replica of the shoe sole; it has an outer profile and a tread pattern corresponding to the finished shoe sole. Having mating patterns enables an easy placement of the shoe sole shaping insert on the piston, because the insert rests firmly against the piston top and is not moved away by the injection pressure generated later on. Further, placement of the shoe sole shaping insert is very precise which is of importance for the finished shoe for aesthetic reasons and for reasons of optimum bonding between the different density sole materials.

In an alternative embodiment of the invention the shoe sole shaping insert is placed on the bottom or on the side of the lasted upper before the lasted upper is being lowered into the mould. This is of advantage in situations where a different sole material is desired in a location close to the shoe upper, but not close to the outsole.

Preferably, the shoe sole shaping insert has the shape of the heel of a shoe sole, and the first cavity corresponds to a compartment between the upper heel area of the shoe upper and the side frames of the mould. The shoe sole shaping insert is interfacing with the first chamber, and by decreasing or increasing the height of the shoe sole shaping insert the volume of the first cavity can be increased or decreased. Thus, e.g. lowering the height of the insert is an easy way of enlarging the area on the upper covered by the first density sole material. A part of the interface between the shoe sole shaping insert and the first cavity is an edge of the insert. Tests showed that the bonding between the sole material of the first injection and the material of the second injection became inferior due to trapped air in the cavity. Bonding can be improved by giving the edge of the shoe sole shaping insert a tapering starting from the meeting point of edge and first cavity and stretching towards the shoe upper. For example, an inclination of 45degrees can be made, or the edge can be shaped as a half U.

In the preferred embodiment of the invention, the first cavity is surrounding the upper in the heel area. Injection of sole material into the mould is in a known manner done from the rear side of the lasted shoe while it is placed in the mould. Normally, injection is made into a cavity having a relatively large volume, e.g. a volume corresponding to the whole sole, and this does not pose problems during manufacture. In the present case the first injection channel is placed in a position above the bottom piston, the second injection channel and the shoe sole shaping insert, and injection is made into the first cavity which surrounds the upper. Due to the elevated position of the first injection channel, the injection machinery so to speak injects directly into a wall, namely the heel of the upper, and this causes problems with the flow of the sole material, which does not flow into "remote" areas of the first cavity. Using an elongated injection hole for the first cavity instead of a conventional circular hole has solved this problem, because a nozzle effect is achieved. The injection pressure is increased just before entering the first cavity by narrowing the circular supply channel and making a narrow elongated hole which opens into the first cavity.

Preferably, the shoe sole shaping insert has a cavity on the surface facing the bottom sole of the lasted upper. The cavity corresponds essentially to the shape of a shank which is preferably adhered to the bottom of the lasted upper prior to injection. After positioning the last with upper in the mould, the shank rests in the cavity during the first injection.

The shoe sole shaping insert can be used as a means for distributing sole material from one cavity to another or from an injection channel to a cavity. A communication channel can be made embedded inside the insert or on the surface of the insert, and sole material can flow in this channel during injection. In this way e.g. a three-density horizontally segmented sole can be made with two injection channels in the mould.

In cases where the first cavity has a relatively low volume because it is delimited by the shoe sole shaping insert, the shoe upper and the side frames of the mould, back flow of the injected sole material tends to happen through the first mould injection channel. This problem can advantageously be alleviated by making one or more channels in the shoe sole shaping insert, which channels function to divert away surplus sole material from the first cavity.

In order to lower an unwanted adhesion between shoe sole shaping insert and sole material, the insert must be manufactured in the proper material, or treated with a chemical release agent. Silicone, wood, aluminium or primed rubber are candidates with silicone being the preferred choice. The shoe sole shaping insert must be able to withstand thousands of production runs.

Preferably a plurality of independent shoe sole shaping inserts can be placed inside the injection chamber. This enables the use of an increased number of different density sole materials.

The invention also relates to a shoe sole shaping insert used in a mould for injection of shoe soles. The insert has a first surface portion with a tread pattern intended for matingly fitting the tread pattern of a bottom piston of a mould, and a second surface portion with a cavity for receiving a shoe upper.

The invention will now be described by means of the drawings where

FIG. 1 shows the end product of the present invention, a shoe 1 manufactured with a multi-density sole 3 according to the inventive method. In this preferred embodiment, the sole consists of a midsole 4, a heel cap 5 and an outsole 6, typically a TPU outsole. Posts 7 and 8 in the lower heel portion 9 are provided to stabilize the foot during walking. In the upper heel portion 10 the heel cap 5 ensures a 180 degrees firm grip around the heel of the human wearer. In order to ensure this firm grip the heel cap 5 consists of polyurethane which has a higher density than the polyurethane used for the midsole 4. Thus, instead of manufacturing midsole 4 and heel cap 5 in only one polyurethane, different density polyurethanes are used for achieving different characteristics of the sole in different places. FIG. 2 shows the sole 3 without the upper 2 and FIG. 3 shows the heel cap 5 as a discrete part of the sole. As will be described later the heel cap is initially produced in a first manufacturing step and adhered to upper 2, whereupon heel cap 5 and midsole 4 are bonded together in a second step during an injection procedure. Midsole 4 has in the heel area section 15 a contour line 11 meeting the rim 14 of the heel cap. The convex shape 12 of the post 7 matches the concave shape of indentation 13. FIGS. 4, 5 and 6 show the U-shaped heel cap 5 from different perspectives, in particular FIG. 6 shows the approximate thickness of the polyurethane rim 14, which varies between 3-6 millimeters.

Figure 1:
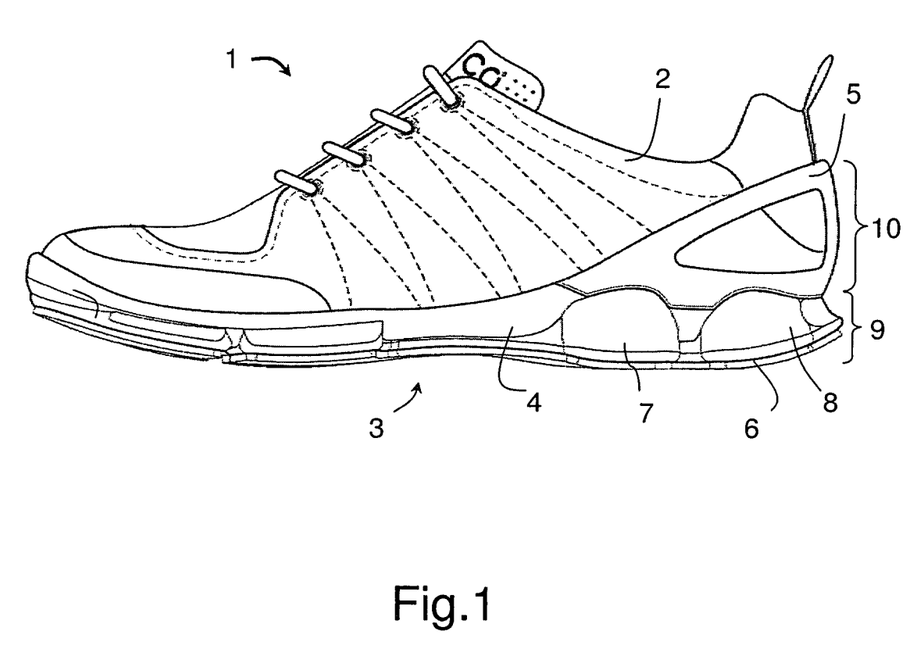
FIG. 1 shows a shoe with a sole manufactured according to the invention
Figure 2:
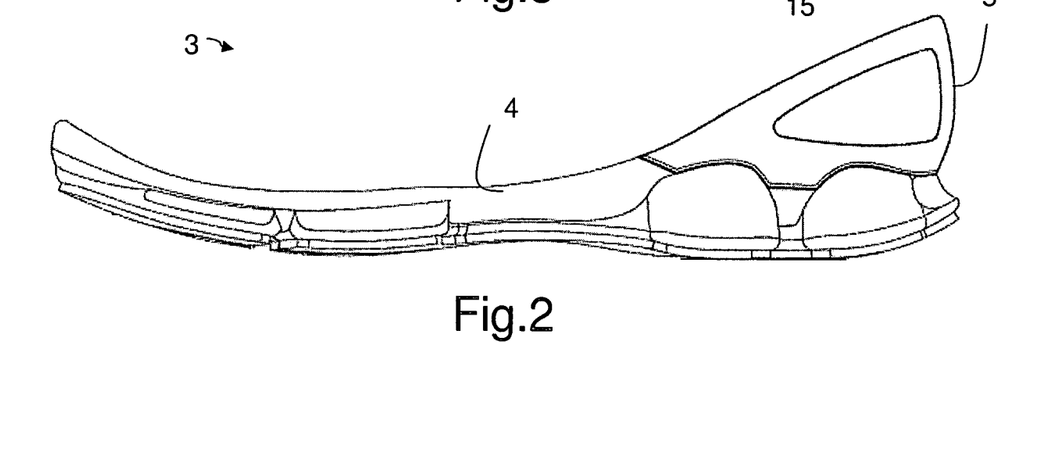
FIGS. 2 and 3 show the outsole, the midsole and a heel cap made according to the invention
Figure 3:
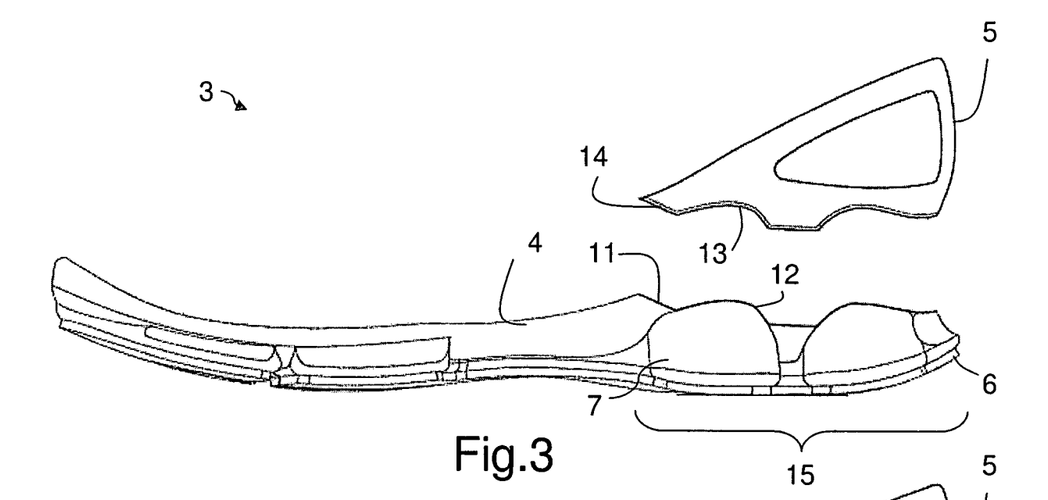
Figure 7:
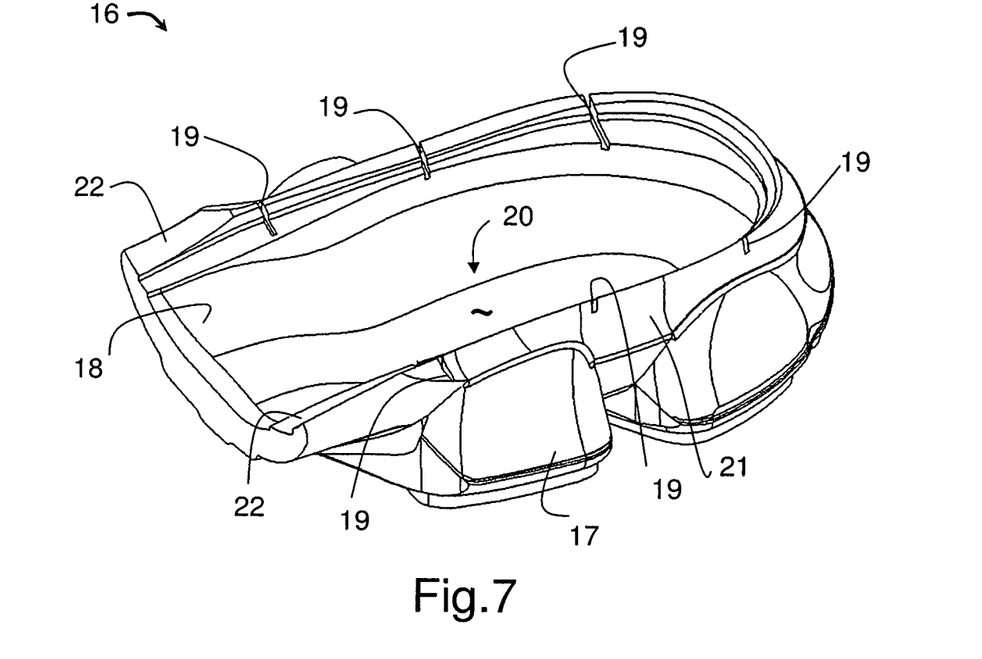
FIGS. 7, 8, 9, 10 and 11 show the shoe sole shaping insert used in the invention
Figure 8:
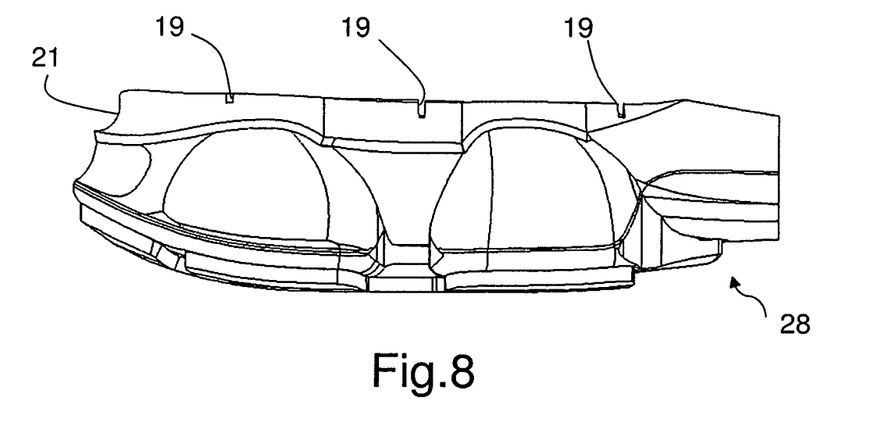
Figure 9:
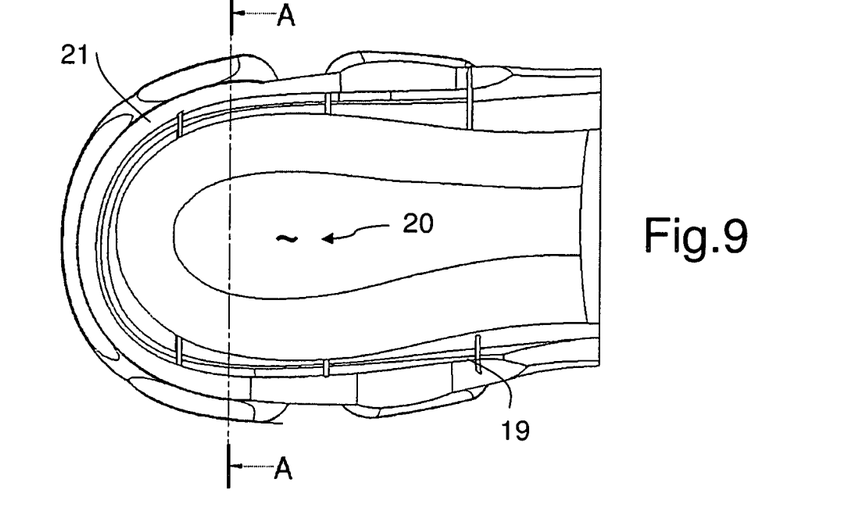
Figure 10:
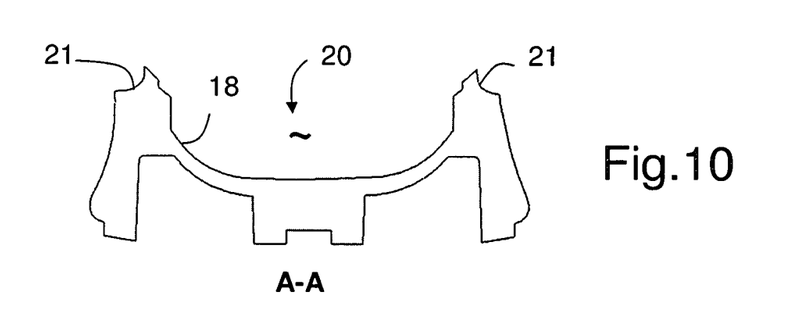
Figure 11:
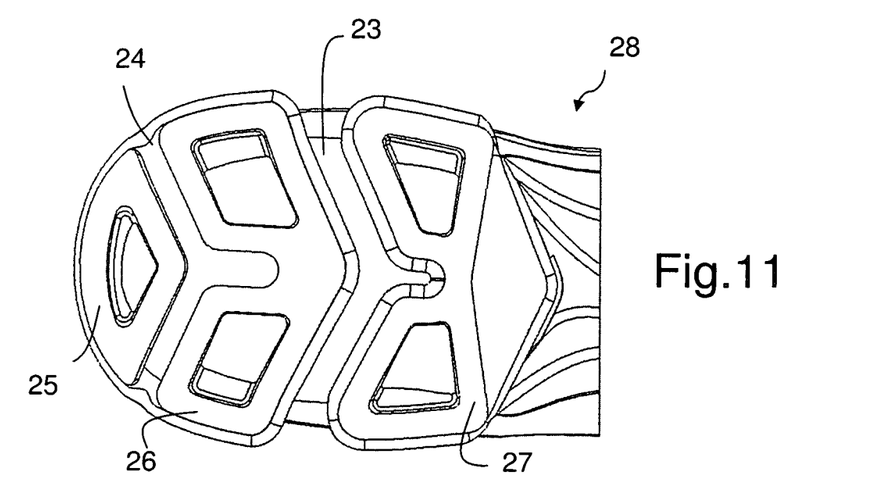

According to the invention, manufacturing of the sole 3 is made by means of a shoe sole shaping insert 16 as shown in FIG. 7. The insert is made as a replica of section 15 of the midsole 4 as shown in FIG. 3. Shoe sole shaping insert 16 is a means for manufacturing the sole, but does not itself end up as part of the sole. Preferably, the insert is solid and consists of silicone. It looks on the bottom surface and on its lateral and medial side as the sole which is to be produced. For example, post 17 corresponds in FIG. 7 to post 7 in FIG. 3. The insert has an upper surface 18 and channels 19 for diverting away surplus polyurethane. A cavity 20 with a depth of five to ten millimeters has the function of receiving a shank placed on the insole of the shoe upper. A slanted or tapered edge 21 of the insert is shaped like a half U and is inclined from the outer edge of the insert 16 towards a shoe upper (shoe upper not shown in FIG. 7). A contact area 22 is not inclined as described, but intended for full contact to the side frames of the mould. FIG. 8 is a right side view of the shoe sole shaping insert 16, FIG. 9 is a top view and FIG. 11 is a bottom view. FIG. 10 is a cut-away view of the insert 16 along a line A-A and shows the tapered edge 21 in detail. This edge runs along the perimeter of the insert and gives after injection the rim 14 of heel cap 5 an inclined shape which allows the polyurethane of midsole 4 to bond intimately to the polyurethane of the heel cap. The insert 16 is partly a replica of the midsole to be produced, and has grooves 23 and 24 being five millimeters deep and three to five millimeters wide as shown in FIG. 11. Tread islands 25, 26 and 27 correspond, as do grooves 23 and 24 and the outer perimeter contour of insert 16, to the shape in a bottom piston of the mould. Insert and bottom piston are matingly fitting each other, or, said in another way, the insert is the positive pattern, and the top of the piston the negative pattern. An arch part 28 of the insert has a lower vertical thickness than tread islands 25, 26 and 27. The shoe sole shaping insert 16 does not extend the full length of the sole, but only from heel to midfoot. It will be readily understood, however, that an insert could be made in the full length of the sole, or be placed only at the toe end.

Figure 12:
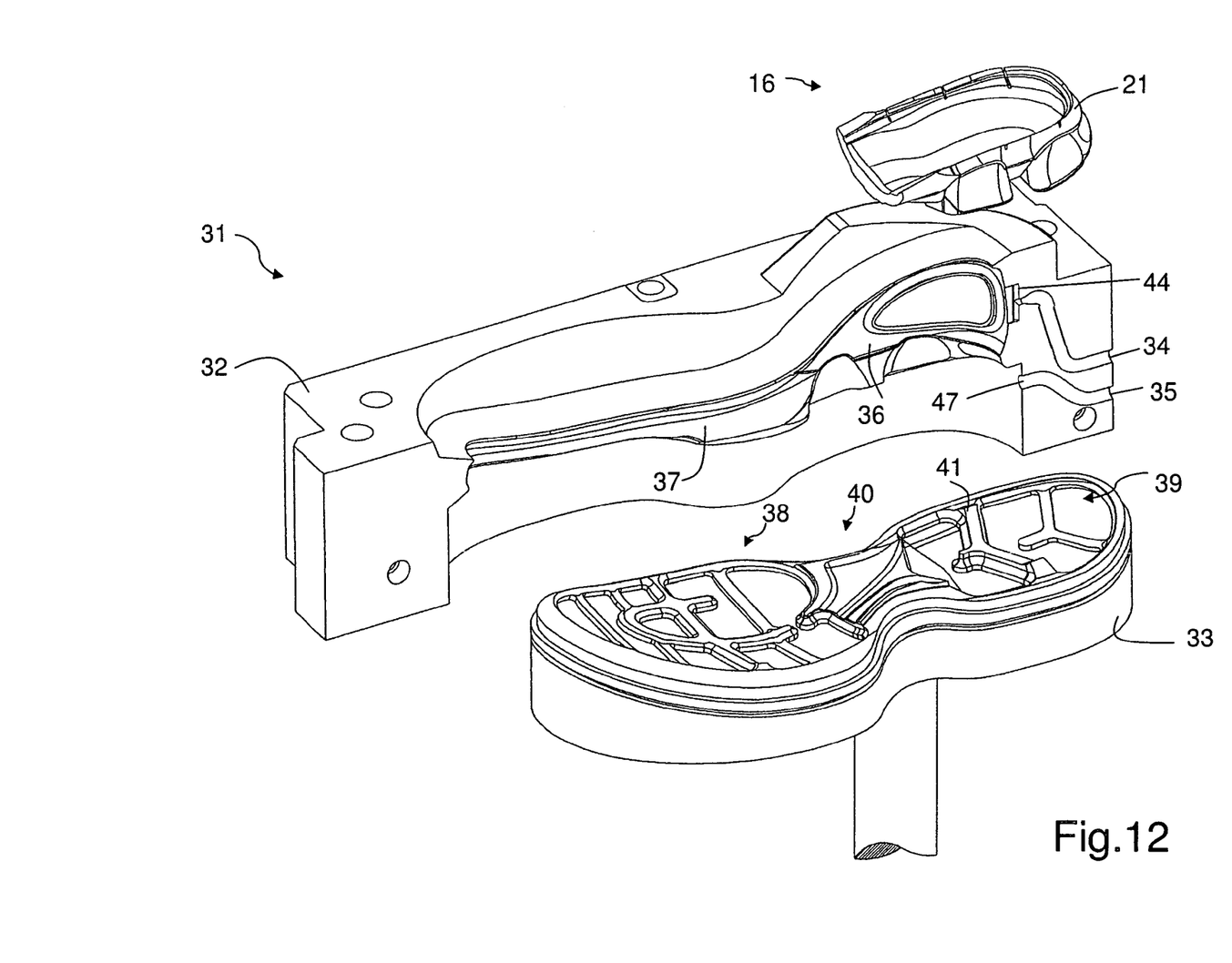
FIG. 12 is a view of the mould, the bottom piston used and the shoe sole shaping insert
Figure 13:
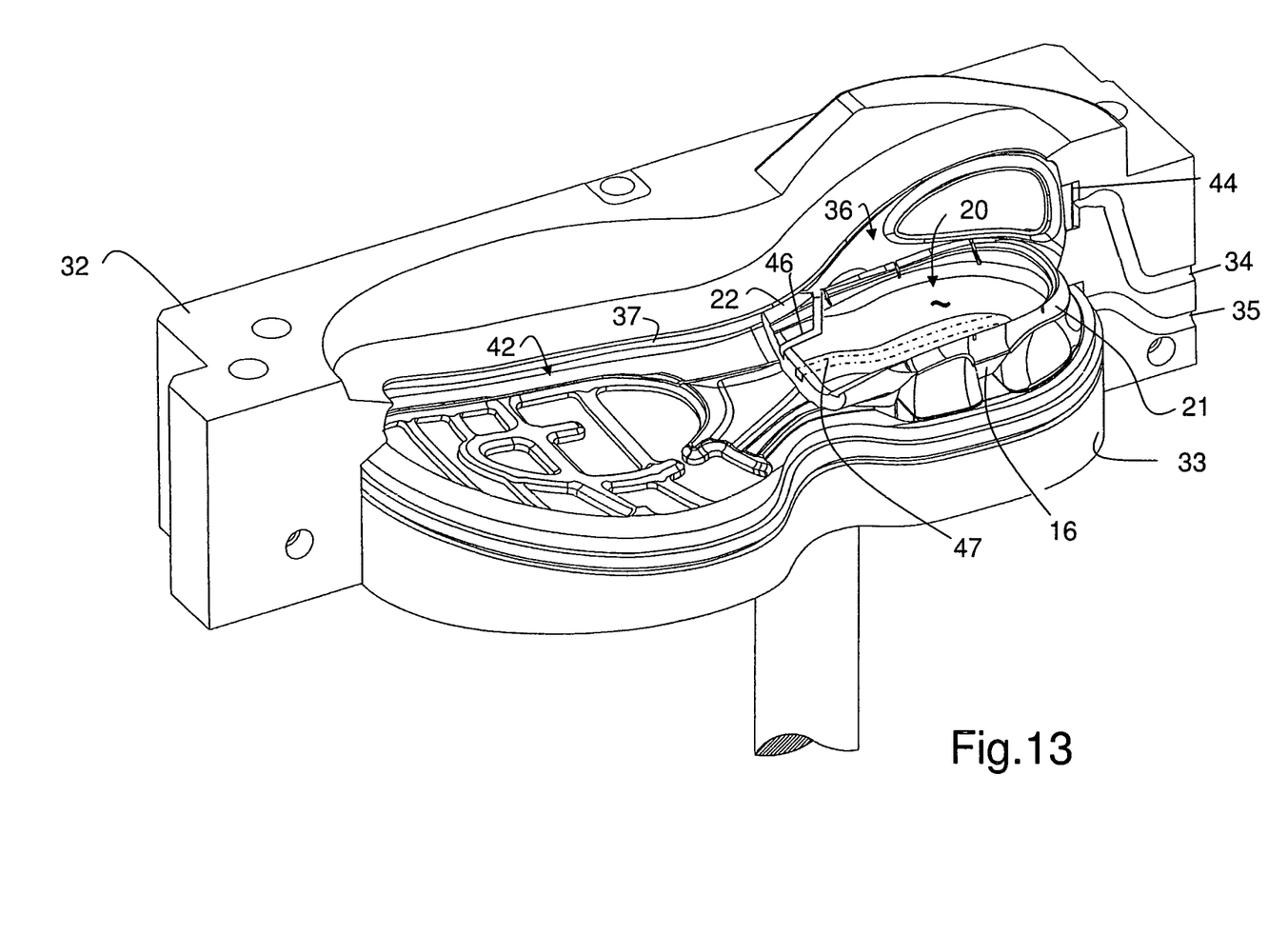
FIG. 13 shows the placement of the shoe sole shaping insert according to one embodiment of the invention
Figure 14:
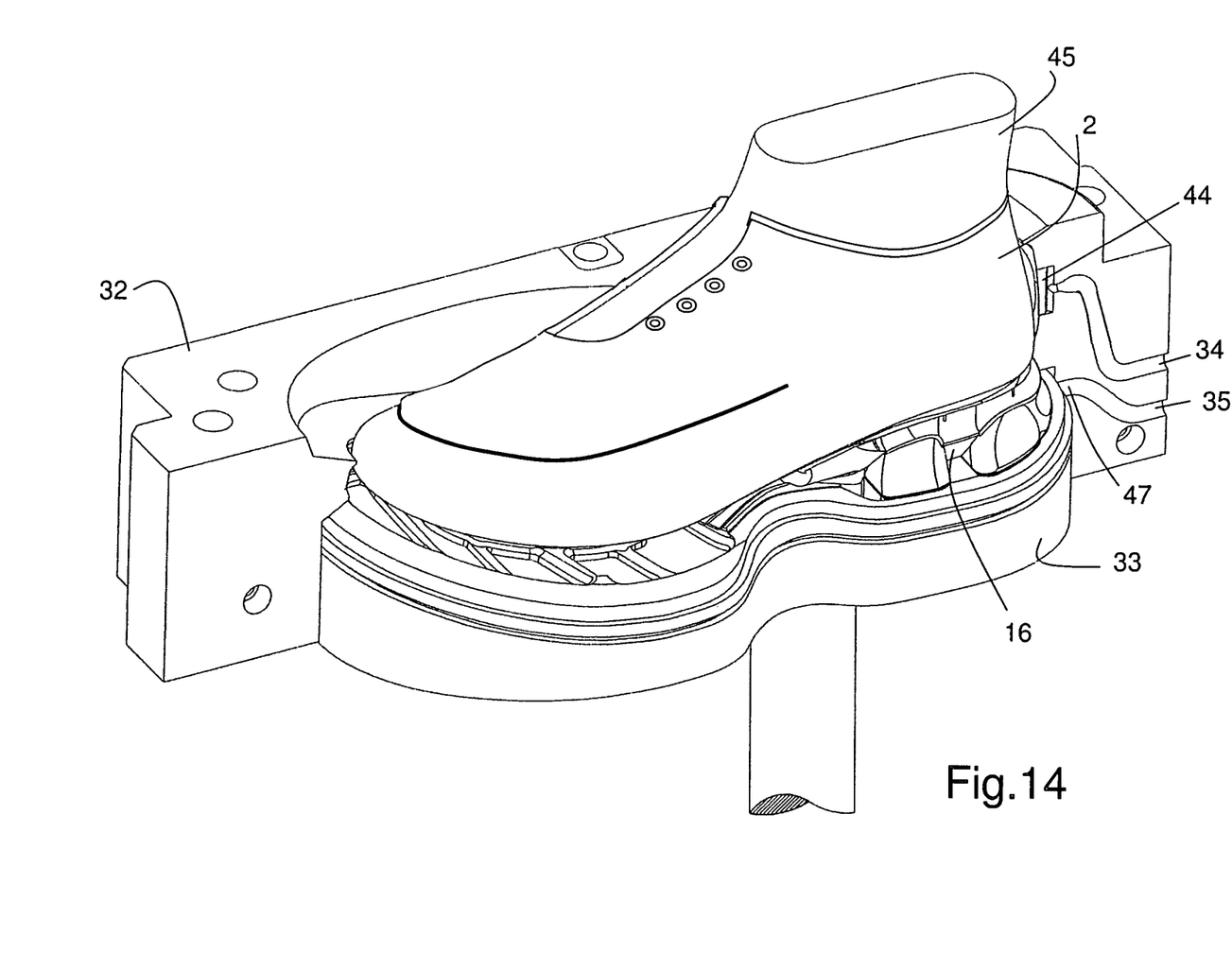
FIG. 14 shows a lasted upper placed on the insert in the mould

FIGS. 12, 13 and 14 show the insert and the apparatus used for the inventive method. A mould 31 consists in a known manner of side frames 32 (only one side frame is shown, the other has similar proportions) and a bottom piston 33. The side frames can be moved horizontally, and the bottom piston can be moved vertically. A last with a shoe upper will be placed above the top of the bottom piston 33 whereafter side frame 32 will move horizontally towards the upper and finally abut the upper. Then injection of polyurethane is made through a first injection channel 34 and later through a second injection channel 35. Mould 31 defines an injection chamber which is delimited by grooves 37 made in the aluminium wall of the side frame 32 (and correspondingly in the side frame not shown) and the tread pattern 41 formed on the top of bottom piston 33 and a lasted upper lowered into the injection chamber. The tread has a forefoot volume 38, an arch volume 40 and a heel volume 39. The injection chamber thus consists of the combined volume created by the grooves in the side frames, the top of the bottom piston and an upper placed in the mould 31.

Figure 4:
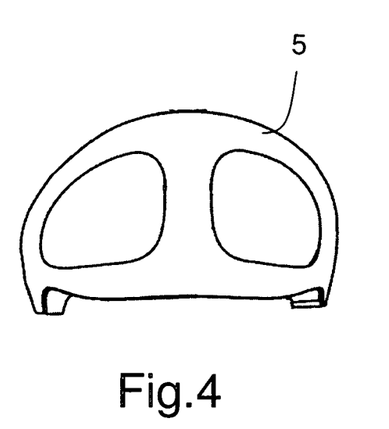
FIGS. 4, 5 and 6 show a polyurethane heel cap in detail
Figure 5:
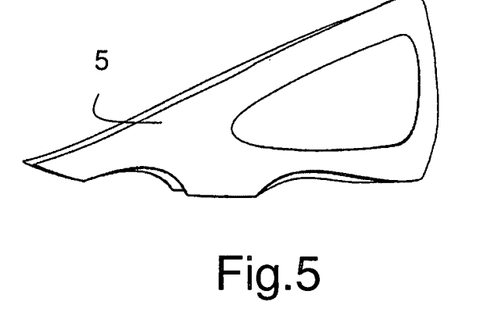
Figure 6:
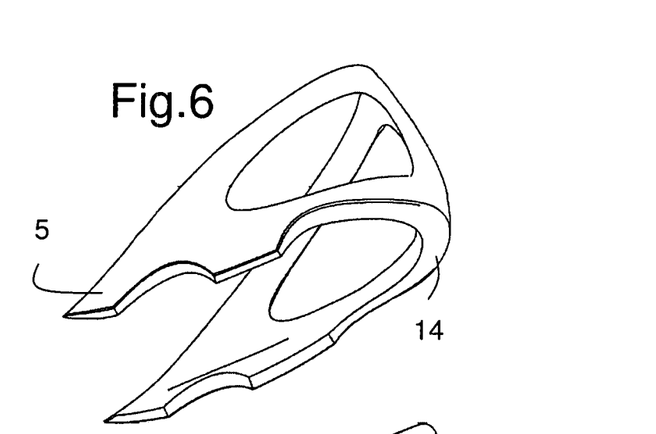

The inventive method is performed in the following way, and explained by way of FIGS. 12, 13 and 14. An upper 2 is lasted on a last 45, and roughened mechanically or by laser in selected regions of the upper in order to obtain good adhesion of the sole to the upper. Then, shoe sole shaping insert 16 is placed on top of bottom piston 33 as shown in FIG. 13. Placement of the insert can be made simply by hand, semi-automatically or fully automatically. Due to the insert being a replica of a finished sole in the heel area, the insert rests fixed on top of the bottom piston, and is precisely placed. When placed on the bottom piston, the insert 16 delimits a first cavity 36 and a second cavity 42. The first cavity corresponds in shape to the heel cap 5, and the second cavity to the forefoot area of the sole. Both cavities are to be filled with polyurethane, as is the cavity made once the insert 16 has been removed. In the next step, the lasted upper with a shank (shank not shown in the Figures) mounted on the insole of the upper is lowered into the mould and placed above the bottom piston 33 and on top of insert 16 as shown in FIG. 14. Cavity 20 of the insert is receiving the shank placed underneath the upper. The two side frames of the mould are moved horizontally towards each other and abut the upper, whereafter bottom piston 33 is elevated and seals the mould. The entire body of the shoe sole shaping insert 16 is now placed inside the injection chamber and is releasably mounted in the tread pattern of the bottom piston. The first injection with polyurethane is made through first injection channel 34. The polyurethane will flow in all places inside the mould except where the insert 16 is placed or where it blocks the passage of polyurethane. Such blocking happens in contact area 22 of FIG. 13 (and correspondingly on the side frame part not shown), which closes the passage way to second cavity 42. The contact area 22 is made with a sharp edge on insert 16 which has firm contact to the side frame 32 and extends into grooves 37 and seals them off for passage to cavity 42. Also, tapered edge 21 seals off the first cavity 36 and prevents the first density polyurethane from injection channel 34 from entering areas closer to the bottom piston. The polyurethane will therefore stay in the first cavity 36 and surround the U shaped heel of the upper to build a heel cap as shown in FIGS. 4 to 6. After the first injection, the two side frames are moved horizontally away from the lasted upper, which now has a heel cap 5 bonded to it, and the lasted upper is lifted from the mould. Typically, the insert 16 is bonded to the rim 14 of the heel cap 5 on its tapered edge 21 and therefore follows the lasted upper during lifting. The insert 16 is removed from the upper by the operator, and the sprue of the polyurethane heel cap is removed. The rim 14 of the heel cap 5 is then cleaned chemically in order to enhance adhesion to the polyurethane of the second injection. A pre-manufactured TPU outsole is then placed on top of the bottom piston, and the lasted upper with polyurethane heel cap 5 is lowered into the mould again, whereafter the side frames abut the upper 2. As shoe sole shaping insert 16 has been removed the injection chamber now corresponds to the full midsole 4 of the shoe, and a second injection with a polyurethane different from the first polyurethane is made through the second injection channel 35. First injection channel cannot be used because cavity 36 is filled with the heel cap 5. After curing and cross linking between the two polyurethanes the mould is opened and the multi-density sole is fixed firmly to the upper.

Figure 15:
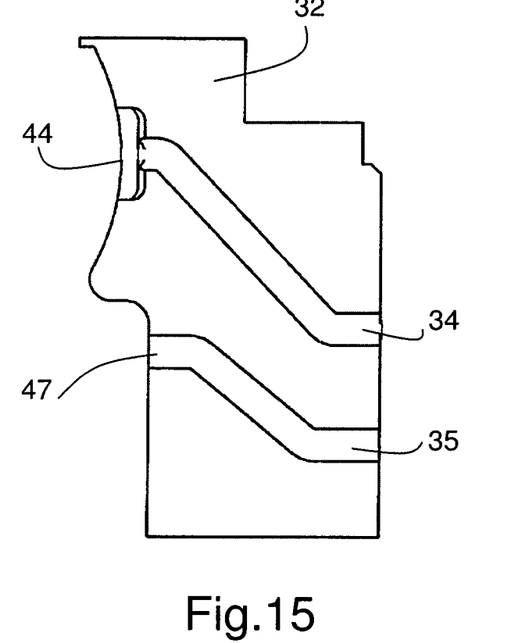
FIG. 15 is a cut away view of the injection part of one side frame of the mould
Figure 16:
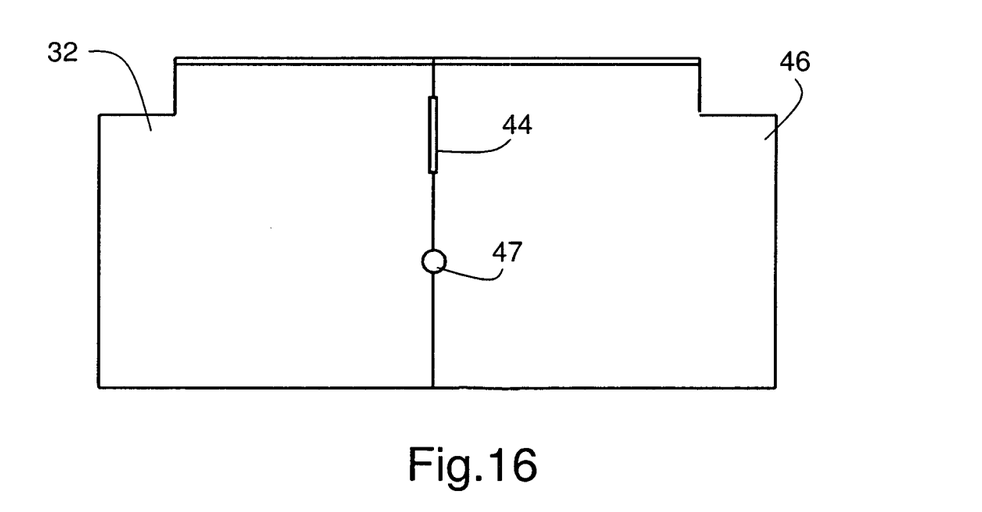
FIG. 16 is a front view showing the injection holes inside the mould

In this preferred embodiment, the first injection is made on an upper heel portion 10, where the insert 16 has delimited a first cavity 36. The injection channel 34 is thus looking directly into the heel of a shoe upper instead of looking into an open volume, which is the normal situation in sole injection. Referring to FIG. 14 the distance between heel upper and injection hole 44 is only six millimeters, and this can cause problems with the correct distribution of the polyurethane. Distant corners may not be filled. However, by making the injection hole 44 facing the first cavity narrow and elongated instead of circular, an improved distribution of the polyurethane was achieved due to a nozzle effect made. FIGS. 15 and 16 show this in more detail. First injection channel 34 has the elongated opening 44 having approximately the double height of the opening 47 of the second injection channel 35. In a front view of the injection part of the mould FIG. 16 shows side frame part 32 and corresponding side frame part 46. Injection hole 44 is elongated and narrow and has in the present embodiment the dimensions 20 millimeters times 1 millimeter.

Shoe sole shaping insert 16 has channels 19 as shown in FIG. 7. Due to the low volume of the first cavity 36 back flow of the polyurethane tends to happen through injection hole 44 and channel 34. By making diversion channels 19 in the tapered edge 21 surplus polyurethane will during injection be diverted into these channels instead of back flowing, or instead of entering through stitchings in a textile sole of the upper. Diversion channels 19 reduce the back flow pressure. The channels have a length sufficient for housing the surplus polyurethane amount, and can be made in the surface of the insert 16 or inside the insert. They are placed just prior to the contact area 22 of the insert where the flow of polyurethane is stopped by the insert, and placed with proper distances to each other around the perimeter of the edge 21. In the embodiment shown a total of six diversion channels 19 are placed in the insert, each channel having a direction from the outside to the inside of the insert 16.

Yet a further embodiment of the invention concerns the possibility of manufacturing a shoe welt (not shown in the drawings). A shoe welt is a visible part of the sole that follows the contour of the shoe and so to speak is the interface between the sole and the upper. The welt is a visible rim along the perimeter of the shoe, and can be made with the inventive method. In this embodiment, the shoe sole shaping insert would be a nearly full replica of the finished sole, but be slightly thinner than the sole and/or have a tapered edge (like 21 in FIG. 7 or FIG. 10). The first injection sole material would then either be a welt adhered to the upper, or a full thin layer extending underneath the upper and being terminated by the welt.

Referring to FIG. 13, in a further embodiment of the invention, a horizontally segmented two-density sole can be made by injecting polyurethane through the first injection channel 34 into first cavity 36 and second cavity 42. The first cavity and the second cavity communicate either via a channel in the side frame of the mould or preferably through a channel 46 in the insert 16. Such channel in the insert can be made in the surface of the insert or inside the insert. After removal of the insert as described in the previous embodiment a second density polyurethane is injected through the second injection channel 35 into the cavity created by removal of the insert. This embodiment enables the manufacture of a horizontally segmented two-density sole, i.e. a sole having alternating first and second sole materials along the longitudinal length of the sole.

The invention has until now been described by example of two-density soles. Staying with FIG. 13 but assuming that channel 46 is not present, yet a further embodiment of the invention concerns a three-density sole which can be made if a first density polyurethane is injected into the first cavity 36 through the first injection channel 34 and a second density polyurethane is injected into the second cavity 42 through the second injection channel 35. The second cavity 42 and the second injection channel 35 communicate either via a channel in the side frame of the mould or through a channel 47 in the insert. Channel 47 is shown in dashed line, and is embedded in the insert. After removal of the insert 16, a third density sole material is injected through the second injection channel 35 into the space or compartment created by the removal of the insert.

The invention is described with two injection channels, but three or more channels can be used, each with sole material of different density and/or different colour. As the preceding embodiments have shown the inventive method is versatile and enables a multitude of material combinations on the sole essentially without amending the mould.

The described embodiments can be combined in different ways.

The invention claimed is:

1. A method for manufacturing a shoe sole (3) by injection moulding sole material onto a shoe upper (2) mounted on a last (45), forming a lasted shoe upper, where the sole is attached to the shoe upper after repeated injections, the method comprising:
   placing a shoe sole shaping insert (16) in a mould (31) prior to a first injection, the mould having an injection chamber, movable side frames (32), and a vertically moveable bottom piston (33), the shoe sole shaping insert (16) positioned entirely inside the injection chamber;
   injecting a first sole material of a given colour and given density into a first cavity (36) through a first mould injection channel (34);
   removing the shoe sole shaping insert (16) from the mould after the first injection and prior to a second injection; and
   injecting a second sole material of another colour and/or density through a second injection channel (35) into a second cavity made by removal of the shoe sole shaping insert,
   wherein the first cavity occupies a first continuous area along a length of the injection chamber, the second cavity occupies a second continuous area along the length of the injection chamber, and the shoe sole shaping insert separates the first and second cavities along the length of the injection chamber.

2. The method according to claim 1, further comprising injecting a third sole material of a third colour and/or density through the second injection channel into the second cavity.

3. The method according to claim 1, wherein the shoe sole shaping insert (16) has a tread pattern (25, 26, 27), which matingly corresponds to a pattern (41) of the bottom piston (33), and wherein the shoe sole shaping insert is matingly fitted onto the corresponding tread pattern of the bottom piston before the first injection.

4. The method according to claim 1, wherein the lasted shoe upper rests against the shoe sole shaping insert (16) when placed in the mould (31).

5. The method according to claim 1, wherein the shoe sole shaping insert (16) is fitted onto the lasted shoe upper (2) prior to the first injection and then lowered with the last (45) into the mould (31) for said first injection.

6. The method according to claim 1, wherein the shoe sole shaping insert (16) has the shape of the heel of a shoe, and wherein the first cavity (36) corresponds to an upper heel area (10) of the shoe upper.

7. The method according to claim 1, wherein the shoe sole shaping insert (16) has an edge (21), which interfaces with the first cavity (36), and is tapered from the interface extending in a direction towards the shoe upper.

8. The method according to claim 1, wherein the first mould injection channel (34) has an elongated opening (44) for injecting sole material into the first cavity.

9. The method according to claim 1, wherein the shoe sole shaping insert (16) is adapted to receive a shank by making a cavity (20) in the shoe sole shaping insert, the shank resting in the cavity (20) during the first injection.

10. The method according to claim 1, wherein the shoe sole shaping insert (16) acts as a distributor for injected sole material and comprises a communication channel (46, 47) for transporting sole material from the first cavity (36) to the second cavity (42) or from one mould injection channel (35) to the second cavity.

11. The method according to claim 1, wherein the shoe sole shaping insert (16) has one or more channels (19) for diverting away surplus sole material.

12. The method according to claim 1, wherein the shoe sole shaping insert (16) is placed inside an outer perimeter of the bottom piston (33).

13. The method according to claim 1, wherein the shoe sole shaping insert (16) is made of silicone, aluminium or rubber.

14. The method according to claim 1, wherein a plurality of independent shoe sole shaping inserts are placed inside the injection chamber.

* * * * *